US008761533B2

(12) United States Patent
Brand et al.

(10) Patent No.: US 8,761,533 B2
(45) Date of Patent: Jun. 24, 2014

(54) METHOD FOR PERFORMING IMAGE PROCESSING APPLICATIONS USING QUADRATIC PROGRAMMING

(75) Inventors: Matthew Brand, Newton, MA (US); Dongui Chen, Medford, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 607 days.

(21) Appl. No.: 13/101,922

(22) Filed: May 5, 2011

(65) Prior Publication Data

US 2012/0281929 A1 Nov. 8, 2012

(51) Int. Cl.
*G06K 9/40* (2006.01)
*G06T 5/00* (2006.01)
(52) U.S. Cl.
CPC ........................................ *G06T 5/00* (2013.01)
USPC ........................................................ 382/254
(58) Field of Classification Search
None
See application file for complete search history.

(56) References Cited

PUBLICATIONS

Taeone Kim, Ki-Sang Hong, "A Practical Single Image Based Approach for Estimating Illumination Distribution from Shadows", ICCV 2005.*
Matthew Brand, Dongui Chen, "Parallel Quadratic Programming for Image Processing", IEEE 2011.*

* cited by examiner

*Primary Examiner* — Chan Park
*Assistant Examiner* — Mark Roz
(74) *Attorney, Agent, or Firm* — Dirk Brinkman; Gene Vinokur

(57) ABSTRACT

A method performs an image processing application by expressing the image processing application as a non-negative quadratic program (NNQP) with a quadratic objective, and nonnegativity constraints. A Karush-Kuhn-Tucker condition of the NNQP is expressed as a fixpoint ratio. Then, the fixpoint ratio is determined iteratively until a solution to the image processing application is reached with a desired precision.

5 Claims, 4 Drawing Sheets

METHOD FOR PERFORMING IMAGE PROCESSING APPLICATIONS USING QUADRATIC PROGRAMMING

FIELD OF THE INVENTION

This invention relates generally to image processing, and more particularly to processing images using quadratic programming (QP).

BACKGROUND OF THE INVENTION

As known in the art, a non-negative quadratic program (NNQP)

$$\min_x \tfrac{1}{2} x^T Q x - x^T h \quad \text{s.t.} \quad x \geq 0, \tag{1}$$

with vectors $$x, h \in \mathcal{R}^n,$$

and a symmetric positive semi-definite matrix $$Q \in \mathcal{R}^{n \times n},$$

where T is a transpose operator is ubiquitous in image processing applications, where x is a vector of non-negative quantities, such as light intensities, to be estimated under a squared error norm.

For example, Eq. (1) subsumes a non-negative least squares (NNLS) problem encountered in deblurring and super-resolution applications, $$\min_x \|Ax - b\|_2^2 \quad \text{s.t.} \quad x \geq 0, \tag{2}$$

with $$Q = A^T A \text{ and } h = A^T b.$$

where A is a blurring or downsampling matrix, and b is a vector of pixel values. Eq. (1) is also the dual of a broader class of convex quadratic programs of the form $$\min_y \tfrac{1}{2} y^T H y - y^T f \quad \text{s.t.} \quad Ay \geq b, \tag{3}$$

h are derived from vectors f, b are matrices A, and H via a dual transform.

Such quadratic programs are used in image labeling and image segmentation applications, and image operations that involve solving Poisson equation, e.g., matting. Solutions of Eq. (1) yield solutions of Eq. (3).

Eqs. (1-3) are well know in the prior art. State-of-the-art interior-point, active-set, and primal-dual algorithms offer linear-to-quadratic rates of convergence, but each iteration requires solution of a linear equation at least as large as Qy=z, which can take $O(n^3)$ time for a vector y of n values. This is impractical for image processing, where the number n of pixels in a single image can be $10^7$ or larger. Obviously this is an extremely complex operation and cannot simply be performed.

Multiplicative update methods are suitable for very large problems. They allow rough estimates of the solution vector to be improved without solving linear equations. Some well-known examples are the Richardson-Lucy deblurring algorithm, the image-space reconstruction algorithm, and Lee-Seung non-negative matrix factorization algorithm. These will turn out to be special cases of the invention presented here.

However, those applications rely on some combination of strictly nonnegative coefficients, positive definiteness, or favorable initialization for convergence, if convergence is provable at all.

SUMMARY OF THE INVENTION

Many image processing and computer vision applications can be solved as a non-negative quadratic program.

The embodiments of the invention provide a convergent multiplicative update that has a simple form and is amenable to fine-grained data parallelism.

Conventional methods for deblurring, matrix factorization, and tomography are covered as special cases. The method can be used for image super-resolution, labeling and segmentation applications.

Particularly, a method performs an image processing application by expressing the image processing application as a non-negative quadratic program (NNQP) with a quadratic objective, and nonnegativity constraints, and expressing a Karush-Kuhn-Tucker condition of the NNQP as a fixpoint ratio.

Then, the fixpoint ratio is determined iteratively until a solution is reached with a desired precision.

Specifically, a method performs an image processing application by expressing the image processing application as a non-negative quadratic program (NNQP) with a quadratic objective, and nonnegativity constraints. A Karush-Kuhn-Tucker condition of the NNQP is expressed as a fixpoint ratio. Then, the fixpoint ratio is determined iteratively until a solution to the image processing application is reached with a desired precision.

DETAILED DESCRIPTION OF THE PREFERRED EMBODIMENT

Figure 1:
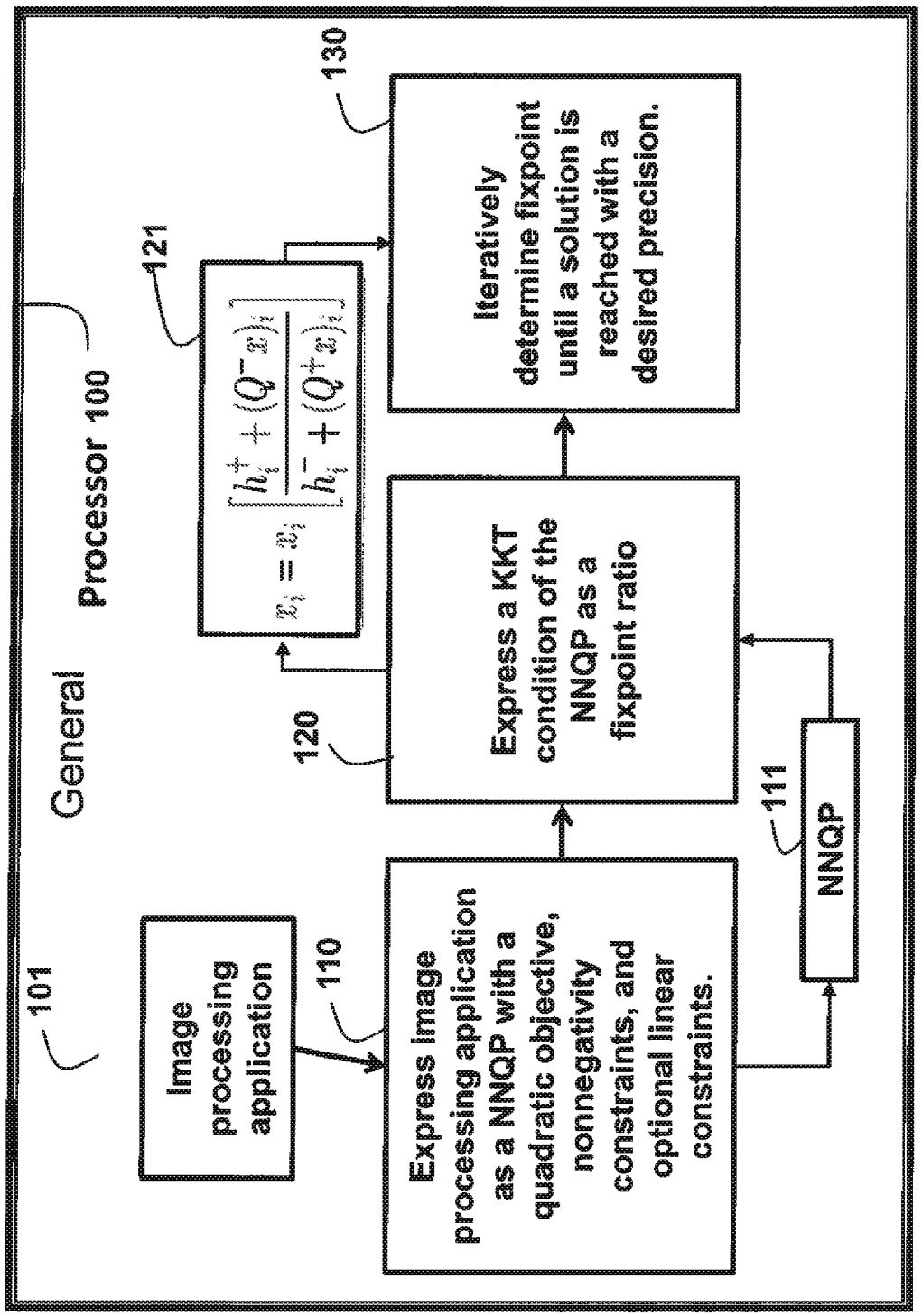
FIG. 1 is a flow diagram of a general method for performing an image processing application according to embodiments of the invention.

We provide a multiplicative update method from Karush-Kuhn-Tucker (KKT) first-order optimality conditions of the Lagrangian function of Eq. (1)

$$L(x, \lambda) = \tfrac{1}{2} x^T Q x - h - \lambda x$$

with $$\lambda \in \mathcal{R}^n > 0.$$

These are $$x \circ \nabla_x L = x \circ (Qx - h - \lambda) = 0$$

$$\lambda \circ \nabla_\lambda L = \lambda \circ x = 0$$

with $\circ$ denoting the Hadamard element-wise product.

The update arises from a variational treatment of the above equation. We define the matrix split $Q = Q^+ - Q^-$ with $Q^+ = \max(Q, 0) + \text{diag}(r)$ and $Q^- = \max(-Q, 0) + \text{diag}(r)$ for some r. Similarly, $h = h^+ - h^-$ with $h^+ = \max(h, 0) + s$, $h^- = \max(-h, 0) + s$.

Using the split, we can write $$x \circ \nabla_x L = x \circ ((Q^+ x + h^-) - (Q^- x + h^+ + \lambda)) = 0.$$

If all $x_i > 0$, possibly infinitesimally, then $\lambda_i = 0$ and, element-wise, $$x_i (Q^+ x + h^-)_i = x_i (Q^- x + h^+)_i.$$

Fixpoint Ratio

Rearranging terms gives the multiplicative update rule $$x_i = x_i \left[ \frac{h_i^+ + (Q^- x)_i}{h_i^- + (Q^+ x)_i} \right],$$

which by construction is stationary at an optimum $x^*$. The right side of the rule can be determined in parallel for all x by a matrix-vector multiply, and a vectorized divide.

Image Processing Applications

Image Super-Resolution

Image super-resolution (SR) refers an image processing application where a set of low-resolution images are combined into a single high-resolution image. Each low-resolution image $g^k$ is assumed to be generated from an ideal high-resolution image f via a displacement matrix $S_k$, a decimation $D_k$ matrix, and a noise process $n_k$:

$$g_k = D_k S_k f + n_k, \text{ for } k = 1, 2, \ldots, K,$$

We use image registration to estimate the displacement matrices $S_k$. Then, we reconstruct the high-resolution image by iteratively solving the NNQP $$\min_{f \geq 0} \frac{1}{2} \sum_{k=1}^{K} \|D_k S_k f - g_k\|^2.$$

This NNQP is converted in the form of Eq (1) and then solved using the above fixpoint ratio.

Image Labeling

In Markov random fields (MRF)-based interactive image segmentation applications, a small subset of pixels is labeled, and the MRF propagates the labels across the image, typically finding high-gradient contours as segmentation boundaries where the labeling changes.

This problem is combinatorial when there are more than two kinds of labels, and usually approximately optimized by network flow process. The problem can also be expressed as a NNQP. Let r be a pixel in the image or the region of interest $\Omega = \{r_i : i = 0, 1, \ldots, N\}$. The class set is denoted by $K = \{1, 2, \ldots, K\}$. Then, the probabilistic segmentation approaches compute a probability measure field $x = \{x_k(r) : r \in \Omega, k \in K\}$, such that $$\Sigma_{k=1}^{K} x_k(r) = 1, x_k(r) \geq 0$$

The set of neighbors pixel r is denoted as $N_r = \{s \in \Omega : |r - s| = 1\}$.

The QP has the form $$\min_x = \sum_{k=1}^{K} \sum_r \left( \frac{\eta}{2} \sum_{j \in N(r)} \omega_{rj} (x_{rk} - x_{rk})^2 + d_{rk} x_{rk} \right),$$

$$\text{s.t.} \sum_{k=1}^{K} x_k(r) = 1, \ x_k(r) \geq 0, \ \forall k \in K, \forall r \in \Omega,$$

the cost $d_{rk}$, of assigning label k to pixel r is obtained from a classifier that is trained with a small set of labeled, using e.g., a support vector machine (SVM), which is trainable using a multiplicative update rule described below.

The quadratic term controls the granularity of the regions, i.e., promotes smooth regions. The spatial smoothness is globally controlled by the positive parameter $\eta$, and locally controlled by weight $\omega_{rs} \approx 1$, when the neighboring pixels r and s are likely to belong to the same class, and $\omega_{rs} \approx 0$ otherwise. We set $\omega_{rs}$ to the cosine of the angle between the vectors of two pixels in a LAB color space, which approximates the color response of human vision.

This QP is a convex relaxation of a combinatorial $\{0,1\}$-labeling problem. We solve this QP by putting it in dual form to obtain an NNQP of the form of Eq. (1), then iteratively applying the fixpoint to find the optimal dual vector. The dual vector is then transformed back into the primal vector x using the standard Lagrange dual transformation for quadratic programs. As an alternate solution method, one can derive multiplicative update rules directly from a Lagrangian function, as shown in the next paragraph.

Here the first-order KKT optimality conditions $$\eta \sum_{j \in N(r)} \omega_{rj} (x_{rk} - x_{rk}) + d_{rk} - \lambda_r = 0$$

$$\eta x_{rk} \left( \sum_{j \in N(r)} \omega_{rj} \right) - \eta \sum_{j \in N} \omega_{rj} x_{jk} + d_{rk} - \lambda_r = 0$$

yield a two-step update for primal and dual parameters $$x_{rk} \leftarrow x_{rk} \frac{\eta \sum_{j \in N(r)} \omega_{rj} x_{jk} + d_{rk}^- + \lambda_r}{\eta x_{rk} \left( \sum_{j \in N(r)} \omega_{rj} \right) + d_{rk}^+}$$

$$\lambda_r \leftarrow \lambda_r \frac{1}{\sum_k x_{rk}}.$$

Depending on the size of the image and the number of classes, the MRF QP has 1-2 million variables and converges in 5-6 seconds on a serial processor.

Analysis

We consider here the behavior of the NNQP fixpoint ratio $$x_i = x_i \left[ \frac{h_i^+ + (Q^- x)_i}{h_i^- + (Q^+ x)_i} \right],$$

as a multiplicative update for positive vectors $x \neq x^*$.

The bracketed fixpoint ratio is always non-negative, and positive if $s_i > 0$ or $r_i x_i > 0$). Thus, Eq. 1 preserves the feasibility of x, implicitly satisfying the second KKT condition.

As is the case for gradient descent methods, the fixpoint moves $x_i$ in the direction opposite the partial derivative $\partial_{xi}L(x, \lambda)$.

Indeed, iteration of the rule from any x>0 solves Eq. (1) and, by extension, Eq. (2-3). More precisely, for any $Q \succ 0$ (positive semi-definite), there is a vector r for which the fixpoint rule converges monotonically and asymptotically from any positive x>0 to the optimum of Eq. (1).

The value r guarantees that the update gives a contraction even in the nullspace of semidefinite Q. There are many satisfactory choices of r, for example, $$r_i = \max(\Sigma_j Q^-_{ij}, Q_{ii}).$$

For many strictly positive or strictly convex image processing problems, it suffices to have r=0. Convergence is asymptotic; if $x^*_i = 0$, we obtain $x_i \to 0$ on an ideal infinite-precision computer). On real computers, which use floating point numbers, we see $x_i$ rapidly converge to $x^*$, regardless of its value.

The asymptotic convergence rate is linear. Asymptotically, each iteration of the update rule improves the estimate $\hat{x}$ by a constant number of bits of precision. For the sparse Q matrices typically encountered in image processing applications, each update takes linear serial time or constant parallel time, and a linear number of updates are needed to achieve any fixed precision result. Thus, the multiplicative update rule combines the simplicity and processing speed of gradient descent with the feasibility and convergence guarantees of modern quadratic programming algorithms.

As such, it is particularly well suited for implementation on low-cost parallel processing arrays, such as single instruction, multiple data (SIMD) processor or a graphic processing unit (GPU) in a cellular telephone, especially because Q typically has low bandwidth in image processing applications, so that the update requires very limited communication between processors. One GPU implementations solves a quadratic programs of $10^5$ variables in a fraction of a second.

Image Processing Applications

General

As shown in FIG. 1, our general method performs an image processing application 101 by expressing 110 the image processing application as a non-negative quadratic program (NNQP) 111 with a quadratic objective, and nonnegativity constraints. A Karush-Kuhn-Tucker condition of the NNQP is expressed as a fixpoint ratio 121. Then, the fixpoint ratios is determined iteratively until a solution is reached with a desired precision, wherein the steps are performed in a processor.

Super-Resolution Image Processing Application

Figure 2:
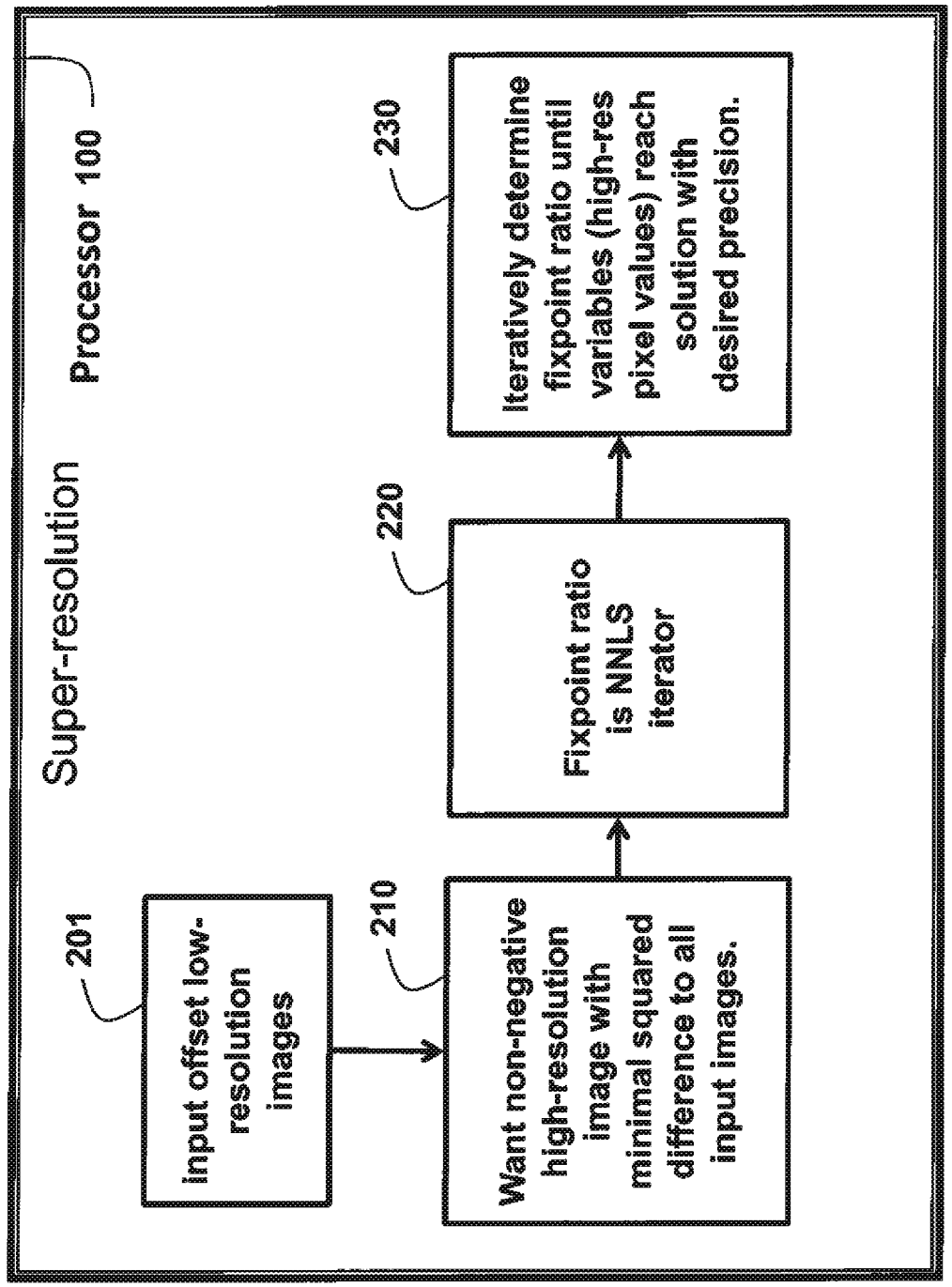
FIG. 2 is a flow diagram of a method for performing an image processing application to generate a high-resolution image from a set of low-resolution images according to embodiments of the invention.

As shown in FIG. 2, out method can be used to generate a high-resolution image. In this application, the input to the method is a set of low-resolution images 201. It is desired to generate a non-negative high-resolution image with minimal squared difference to all input images 210. In this case, the fixpoint ratio is the NNLS iterator 220 described above. Then, the fixpoint ratio is determined iteratively 230 until all variables, i.e., the high-resolution pixel values, are reached solution with desired precision.

Image Processing Application for Labeling

Figure 3:
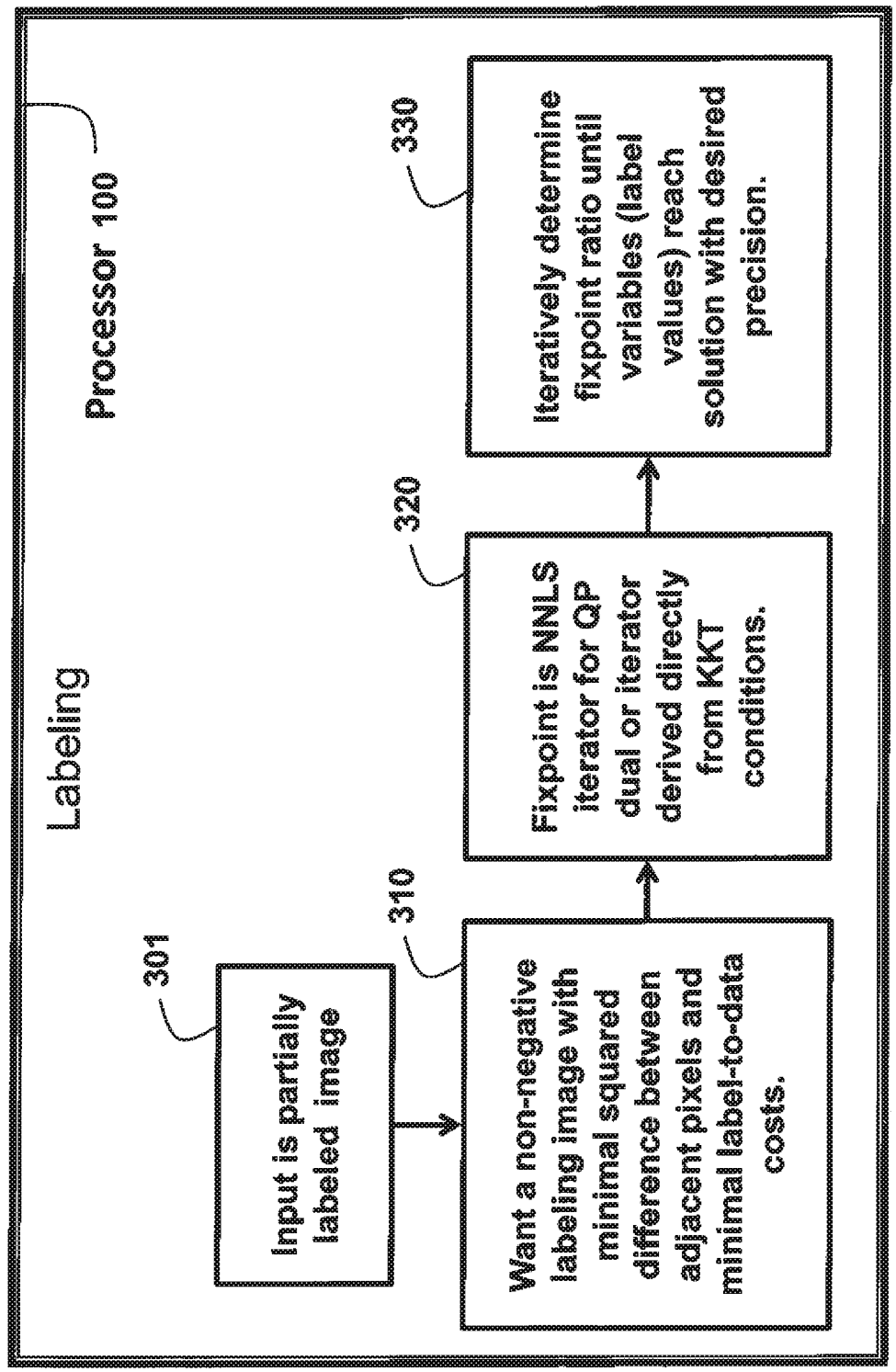
FIG. 3 is a flow diagram of a method for deblurring an image according to embodiments of the invention.

As shown in FIG. 3, out method can also be used to label images. In this application, the input to the method is a partially labeled image 301. It is desired to generate a non-negative labeled image with minimal squared difference between adjacent pixels and minimal label-to-data costs 310. In this case, the fixpoint ratio is the NNLS iterator 320 for the QP dual, or the iterator derived directly from the KKT conditions. Then, the fixpoint ratio is determined iteratively 230 until all variables, i.e., the label values, stabilize to a desired precision.

Image Processing Application for Deblurring

Figure 4:
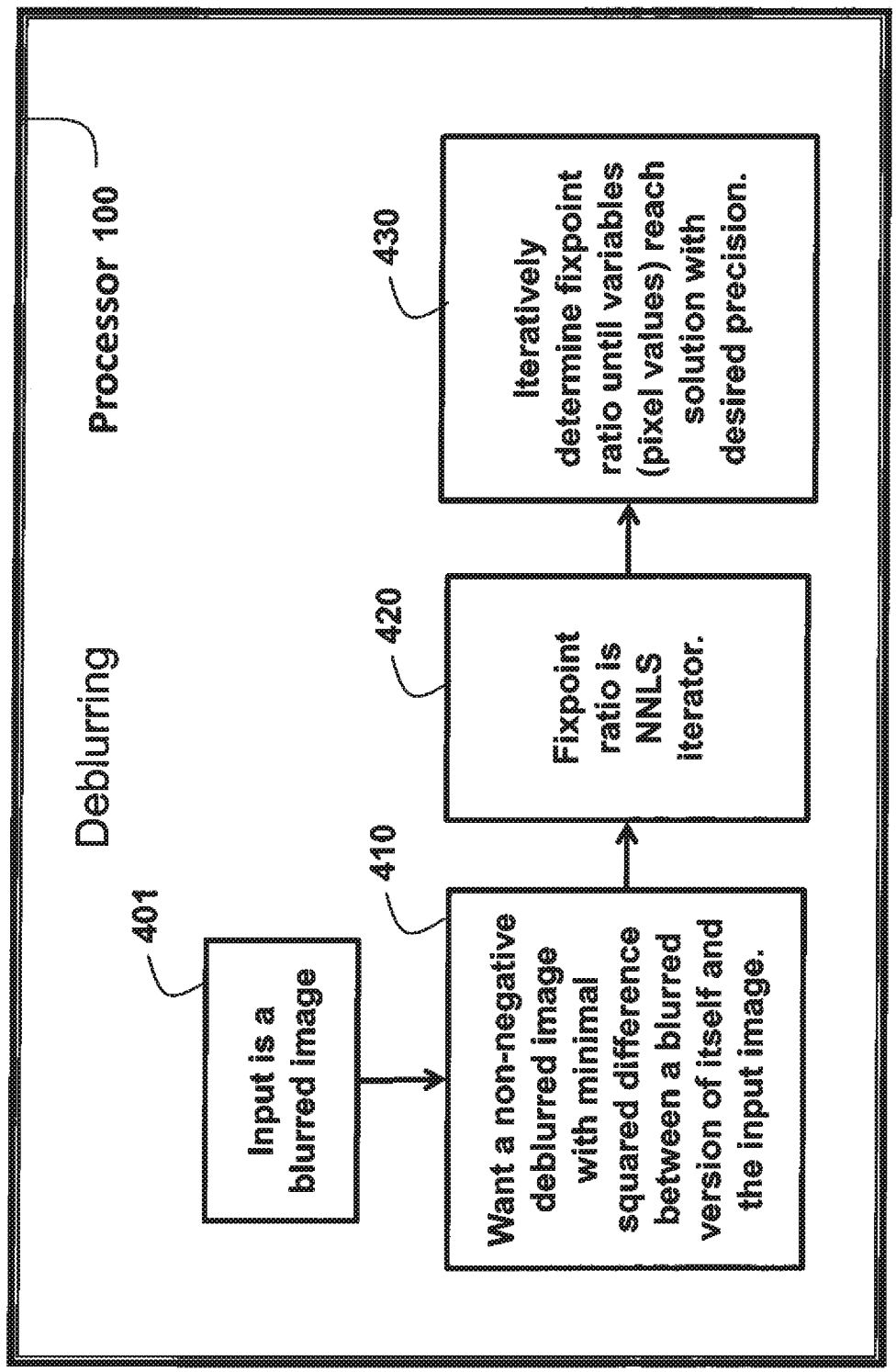
FIG. 4 is a flow diagram of a general method for performing an image processing application according to embodiments of the invention.

As shown in FIG. 4, out method can be used to deblur an image. In this application, the input to the method is a blurred image 401. It is desired to generate a non-negative deblurred image with minimal squared difference between the deblurred image and the input image 410. In this case, the fixpoint ratio is the NNLS iterator 420. Then, the fixpoint ratio is determined iteratively 430 until all variables, i.e., pixel values, are reached solution with desired precision.

Effect of the Invention

By expressing the Karush-Kuhn-Tucker (KKT) first-order optimality conditions as the fixpoint ratio, we obtained a multiplicative fixpoint that can solve very large quadratic programs on low-cost parallel processors.

The update converges from all positive initial guesses. We also proved asymptotic linear convergence rate. Although QP problems are ubiquitous in image processing, QP methods are infrequently used because the QPs themselves are prohibitively large.

Our multiplicative update makes the QP approach viable, with one method solving many problems. Moreover, the method is well suited for single instruction, multiple data (SIMD), and multiple instruction, multiple data stream (MIMD) parallel processors.

Our method can be used for super-resolution, image segmentation, deblurring, matting, denoising, synthesis, and tomography applications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for performing an image processing application, comprising the steps of:
    expressing the image processing application as a non-negative quadratic program (NNQP) with a quadratic objective, and nonnegativity constraints;
    expressing a Karush-Kuhn-Tucker condition of the NNQP as a fixpoint ratio; and
    determining iteratively the fixpoint ratio until a solution to the image processing application is reached with a desired precision, wherein the solution to the image processing application is an output image produced by the image processing application, and
    wherein steps are performed in a processor.

2. The method of claim 1, wherein the NNQP has linear constraints.

3. The method of claim 1, wherein an input to the image processing application is a set of low-resolution images, and the fixpoint ratio is a non-negative least squares (NNLS) iterator, and the solution is a high-resolution image.

4. The method of claim 1, wherein an input to the image processing application is a set of partially labeled images, and the fixpoint ratio is a non-negative least squares (NNLS) iterator, and the solution is a set of completely labeled images.

5. The method of claim 1, wherein an input to the image processing application is a blurred image, and the fixpoint ratio is a non-negative least squares (NNLS) iterator, and the solution is a deblurred image.

* * * * *